United States Patent Office 2,944,942
Patented July 12, 1960

2,944,942

METHYLSILYL MERCAPTOACETATES AND THEIR USE IN TREATING HAIR

Roger Charle, Soisy-sous-Montmorency, and Roger Ritter and Grégoire Kalopissis, Paris, France, assignors to Societe Anonyme dite Societe Monsavon-L'Oreal, Paris, France, a corporation of France No Drawing. Filed Aug. 1, 1957, Ser. No. 675,569

Claims priority, application France Aug. 4, 1956

7 Claims. (Cl. 167—87.1)

This invention relates to new organo-silicon compounds, their preparation and the applications of such compounds, in particular to a process for the permanent deformation of live hair and other analogous fibers.

Many organo-silicon compounds may be polymerized e.g. by hydrolysis, by heating, by ultraviolet irradiation, or by addition of catalysts, to yield oils or more or less hard resins of varying luster, generally termed silicones.

Since most of the polymers thus obtained are completely innocuous to human beings and offer other specific advantages, various attempts to utilize these products in cosmetics have been made. Thus known silicones have already been proposed for such diverse applications as their use in brilliantines, in skin protecting creams and in compositions for "permanent" waving of hair.

Processes for effecting the permanent deformation of live hair are also known in which the hair brought to the desired configuration is in a way enclosed in a thin, elastic but sufficiently rigid sheath of a polymerized organo-silicon compound. Prior to this, the hair may or may not have been subjected to a reshaping operation with the help of a keratin softening agent. Such a pre-treatment gives more durable results but the process then involves at least two separate steps.

It is an object of the present invention to provide a new class of organo-silicon compounds, methods for the production thereof and compositions containing the same by means of which a durable deformation of live hair and like fibers may be effected without requiring previous softening of the keratin of the hair.

According to a first feature of the invention there are provided:

Organo-silicon compounds of the general formula—

$$(CH_3)_nSi\left[\begin{array}{c}-O\\ \phantom{a} \searrow \\ \phantom{a} \phantom{a} C-CH_2SH \\ \phantom{a} \nearrow \\ -O\end{array}\right]_{4-n}$$

where $n$ is 1, 2 or 3.

The said compounds are thus the following:

(a) Trimethylsilyl monomercaptoacetate

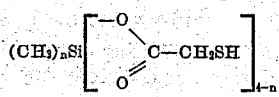

(b) Dimethylsilyl di-mercaptoacetate

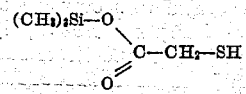

(c) Monomethylsilyl trimercaptoacetate

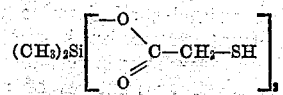

According to a further feature of the invention the compounds as aforesaid are prepared by reacting a methyl chlorosilane of the formula $(CH_3)_nSiCl_{4-n}$ with an excess of an alkali metal thioglycollate, e.g. sodium thioglycollate, under substantially anhydrous conditions and preferably in a non-oxidizing atmosphere, i.e. in the absence of air.

The reaction is preferably effected in an inert solvent medium, such as diethyl ether or benzene, and under a dry nitrogen atmosphere. It takes place in accordance with the following Equation I:

EQUATION I

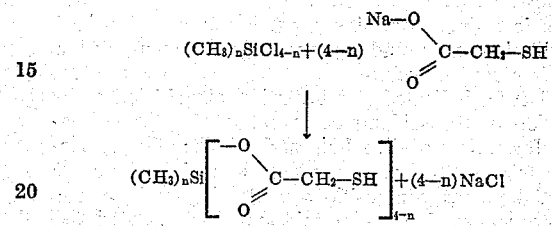

The procedure is preferably the following: the alkali metal thioglycollate, for example sodium thioglycollate, is brought into suspension in the anhydrous solvent and the chlorosilane is gradually introduced in a thin stream, under vigorous stirring, the mixture being the more so cooled as the chlorine content of the chlorosilane used is higher, because the reaction is exothermic. For the preparation of the mono- or dimercapto acetate, the yield is improved by completing the reaction with heating under reflux for 2 hours.

The following examples will serve to illustrate the preparation of the new compounds according to the invention:

Example I

PREPARATION OF TRIMETHYLSILYL MONOMERCAPTO-ACETATE

In a 1 l. round bottom flask with a mercury sealed stirrer and so connected as to operate under a nitrogen atmosphere, 120 g. of sodium thioglycollate are maintained suspended under constant stirring in 500 cc. of anhydrous diethyl ether while 108.5 g. of trimethylchlorosilane are slowly introduced, care being taken that the temperature within the flask never exceeds 30° C. When all the chlorosilane has been introduced, the mixture is refluxed at the boiling temperature for 2 hours in order to complete the reaction.

After cooling, the precipitated sodium chloride is separated, and the solvent removed by distillation. The distillation is continued under reduced pressure in order to obtain the desired compound in a state of substantial purity. It boils at 73–75.5° C. under 30 mm. Hg. The yield of the rectified product is 82.7%.

Iodometric analysis of the latter product indicates a molecular weight of 162 (theoretical molecular weight =164).

Example II

PREPARATION OF DIMETHYLSILYL DIMERCAPTO-ACETATE

In a 2 l. round bottom flask equipped as in Example I, 240 g. of sodium thioglycollate are suspended into 1000 cc. of anhydrous diethyl ether. 129 g. of dimethyldichlorosilane are then slowly introduced under stirring, care being taken that the temperature remains close to 10° C. throughout. The reaction is then completed by boiling for one hour under reflux.

After cooling, the sodium chloride formed is separated, the solvent is evaporated and the residue is distilled under reduced pressure. The dimercaptoacetate boils at 110.5°–112° C. under 1.5 mm. Hg. The yield of the purified product is 78%. Iodometric analysis

Example III

PREPARATION OF MONOMETHYLSILYL TRIMERCAPTO-ACETATE

The procedure followed is substantially the same as in Examples I and II, 178 g. of methyltrichlorosilane being added to 360 g. of sodium thioglycollate suspended in 1250 cc. of anhydrous diethyl ether, the temperature being maintained at about 3–5° C. by external cooling. When the addition is complete the reaction mixture is allowed to revert to the ambient temperature, the sodium chloride formed is separated and the solvent is evaporated. The trimercaptoacetate thus obtained is not stable in heat and tends to decompose readily into a mass of a spongy and elastic resin. For this reason, it cannot be purified by distillation, even under a very high vacuum, and it is therefore used as such.

As already indicated the invention also includes the application of the said mercaptoacetates for the permanent deformation of live hair and of like fibers. According to a further feature of the invention, there are provided aqueous compositions containing at least one mercaptoacetate of the aforesaid type and an anti-precipitating agent. Preferably the concentration of the mercaptoacetate is adjusted so that the amount of mercaptan liberated by its hydrolysis is equivalent to that of a standard solution on the basis of mercaptans for the permanent deformation of hair in the same range of temperatures. The aqueous composition containing the aforesaid mercaptoacetate is then immediately applied to the material to be treated and allowed to remain in contact with said material at the temperature chosen for the operation and until a sufficient softening of said material has occurred. By the term "anti-precipitating agent" is meant any product capable of preventing or at least slowing down the precipitation of the polymerizing product of hydrolysis of the organo-silicon compounds. According to one embodiment of the invention, such an agent may be a lower aliphatic alcohol, e.g. ethyl alcohol and the composition is therefore, a solution of said organo-silicon compound or compounds in an aqueous alcoholic mixture containing 50% of ethyl alcohol.

Alternatively, the anti-precipitating agent may consist of one or more emulsifying or dispersing agents, the aqueous composition containing the organo-silicon compound being then an aqueous emulsion or dispersion.

It must be understood that the hair treating composition should be prepared only at the time of use, since the methyl silyl mercaptoacetates hydrolyze very readily, to yield simultaneously (a) thioglycollic acid or one of its salts, and (b) the corresponding methylsilanols according to the Equation II below. The methylsilanols, of an unstable character, polymerize to form polysiloxanes according to Equation III. While the invention is not to be regarded as limited to such an interpretation, it is considered probable that the hydrolysis gives rise to the general type of reaction hereinafter indicated:

EQUATION II

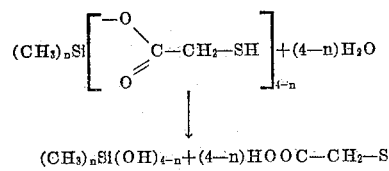

$$(CH_3)_nSi(OH)_{4-n} + (4-n)HOOC-CH_2-SH$$

EQUATION III

This hydrolysis takes place readily in acid, neutral or basic medium. For example, by dissolving 6 g. of dimethylsilyldimercaptoacetate in 50 cc. of an aqueous alcoholic mixture containing 50% of ethyl alcohol, and adding ammonia up to a pH of 9.5, hydrolysis is substantially instantaneous. Moreover, since this reaction is exothermic, it permits of increasing the efficiency of the mercaptan thus liberated, without any external supply of heat.

The compositions are thus of exceptional value for the permanent deformation of hair and according to a further feature of the present invention a process for modifying the configuration of hair, particularly live hair on the human head, comprises constraining the hair to the desired configuration and applying thereto a freshly prepared aqueous composition containing a methyl silyl mercaptoacetate as hereinbefore defined and an anti-precipitating agent as hereinbefore defined. The hydrolysis of the mercaptoacetate apparently generates the mercaptan, which reduces the keratin of the hair. The polymers of the silanols liberated in this hydrolysis constitute valuable products for the hair, which they protect and embellish while increasing its luster and its elasticity and facilitating combing thereof.

The following examples illustrate the application of the mercaptoacetates as hereinbefore set forth to the "permanent" waving of hair.

Example IV

COLD-WAVING 13 cc. of 20% ammonia are added to 50 cc. of an aqueous alcoholic mixture containing 50% of ethyl alcohol. Immediately before it is applied to the hair, 10.4 g. of dimethylsilyl dimercaptoacetate are dissolved therein, and the balance to 100 cc. with the same aqueous alcoholic mixture. A liquid having a pH of 9.5 is thus obtained, which is applied to the hair in accordance with the usual technique of permanent waving by means of mercaptans known per se. The wave thus obtained imparts to the hair greater elasticity and greater luster than are obtained with an aqueous solution containing 8% of ammonium thioglycollate and adjusted to a pH value of 9.5 by the addition of ammonia.

Example V

TEPID WAVING 11 cc. of 20% ammonia are added to 50 cc. of an aqueous alcoholic mixture containing 50% of ethyl alcohol, and 3.9 g. of dimethylsilyl dimercapto-acetate are dissolved therein at the time of use. A solution is obtained which has a pH of 9.5 and which is used in the manner usual in tepid waving by means of mercaptans, with the exception that it is applied to the hair immediately after its preparation. The results obtained are at least as satisfactory as those which can be obtained with a 3% thioglycollic acid adjusted to pH 9.5 by ammonia.

Example VI

TEPID WAVING

A dispersion of the following composition is prepared immediately before use and directly applied to the hair:

| | G. |
|---|---|
| Dimethylsilyl dimercaptoacetate | 3.9 |
| "Cemulsol A" (proprietary name of a condensation product of oleic acid with ethylene oxide) | 3 |
| "Tween 80" (proprietary name of a polyoxyalkylene derivative of sorbitan mono-oleate) | 1.5 |
| Ammonia up to pH | 9.5 |
| Water to make 100 cc. | |

The foregoing examples all describe the use of dimethylsilyl dimercaptoacetate, but it is to be understood that trimethylsilyl monomercapto-acetate or monomethylsilyl trimercaptoacetate or mixtures of any two or all three of the mercaptoacetates can equally well be employed. Also, each of these three compounds can be used crude without any major disadvantage.

The composition according to the invention is useful, not only for the treatment of live hair (for permanent waving or dekinking), but also for treating like fibers and particularly animal fibers such as wool, regardless of whether these fibers are treated in bulk or are already fashioned into dyed or undyed fabrics. The examples given above are therefore not to be regarded as in any way limiting the scope of the invention.

We claim:
1. An organo-silicon compound of the general formula

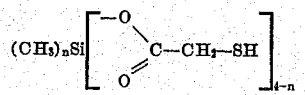

where $n$ is an integer selected from 1, 2 and 3.
2. Trimethylsilyl monomercaptoacetate.
3. Dimethylsilyl dimercaptoacetate.
4. Monomethylsilyl trimercaptoacetate.
5. A process for imparting any desired, stable configuration to hair, particularly live human hair, which comprises submitting said hair, while constrained in said configuration, to the action of a freshly prepared dispersion of an organo-silicon compound of the general formula

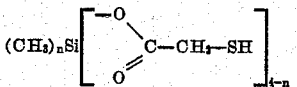

wherein $n$ is a positive integer lower than 4, in an aqueous solution comprising, as an anti-precipitating agent, a substantial amount of ethyl alcohol.
6. A process for imparting any desired, stable configuration to hair, particularly live human hair, which comprises submitting said hair, while constrained in said configuration, to the action of a freshly prepared dispersion of an organo-silicon compound of the general formula

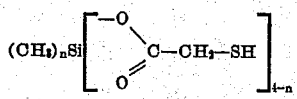

wherein $n$ is a positive integer lower than 4, in an aqueous solution comprising substantially equal amounts of water and ethyl alcohol.
7. A process for imparting any desired, stable configuration to hair, particularly live human hair, which comprises submitting said hair, while constrained in said configuration to the action of a freshly prepared aqueous dispersion of an organo-silicon compound of the general formula wherein $n$ is a positive integer lower than 4.

References Cited in the file of this patent
UNITED STATES PATENTS

| | | |
|---|---|---|
| 2,405,988 | Barry | Aug. 20, 1946 |
| 2,537,073 | MacKenzie et al. | Jan. 9, 1951 |
| 2,566,347 | MacKenzie | Sept. 4, 1951 |
| 2,787,274 | Gant | Apr. 2, 1957 |

OTHER REFERENCES

Hall: Textile Colorist, June 1944, pp. 233–236, esp. at page 235, col. 1.